United States Patent Office 2,970,558
Patented Feb. 7, 1961

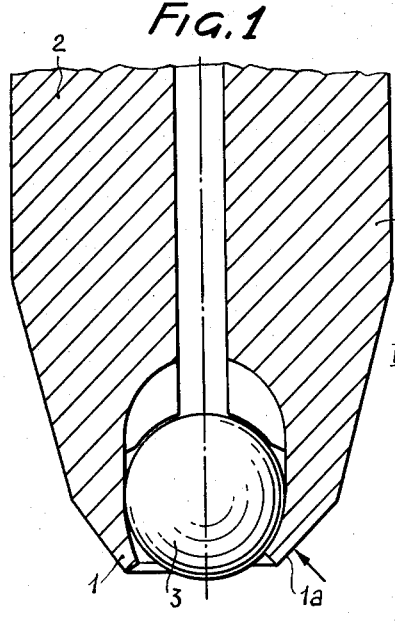
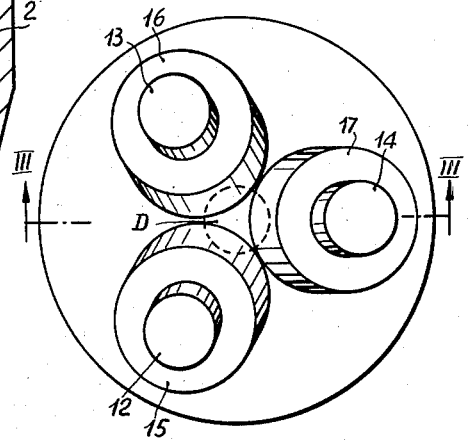
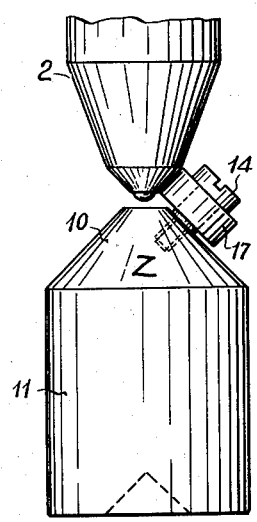
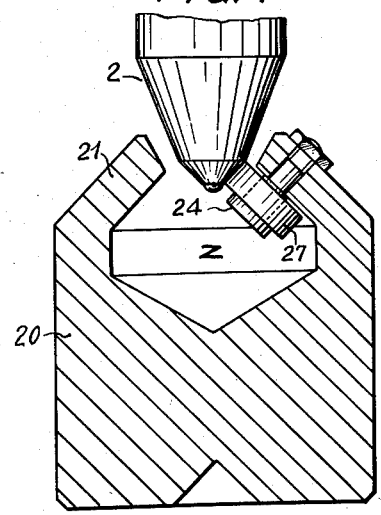

2,970,558
DEVICE FOR RESHAPING THE TIPS OF BALL POINT PENS

Sauro A. Albertini, Via Pazzalino, Lugano-Viganello, Switzerland

Filed Dec. 17, 1956, Ser. No. 628,655

2 Claims. (Cl. 113—32)

This invention relates generally to devices for reshaping the tip of ball point pens and more specifically to the type wherein a cylindrical support which has a frustro-conical surface on one end thereof with a plurality of cantilever bolts mounted on said surface and a plurality of cylindrical rollers rotatably mounted on the free ends of the bolts, the bolts extending normal to the frustroconical surface, spaced equally circumferentially thereabout and spaced an equal distance from the tip of said surface, the inward extensions of the bolts intersecting in a common point on the axis of the support. The device is adapted to be brought adjacent the tip of the ball point with the support in axial alignment with the pen and the cylindrical rollers bearing against the frustro-conical surface of the pen tip, whereby relative rotation of the cylindrical rollers on the frustro-conical surface of the pen tip will generate heat to facilitate deformation of the material of the tip of the pen about the ball therein.

It is well known that the ball point pens, which heretofore have been used do not write perfectly. This is due to the fact that, because of the pressure applied to the ball while writing, the ball itself is pressed laterally against its seat, which therefore undergoes a deformation and does not permit any normal writing.

The device according to the present invention permits the reprofiling or reshaping of the recess which acts as a seat for the ball, so that the ball is recentered in the recess.

Besides being used for the shaping of ball point pens, this device may be utilized as a tool to be applied to machines suitable for shaping the tip of new ball point pens, machines for the wholesale manufacture of ball point pen tips as well as of the complete spare parts.

The above mentioned device is characterized by three shaping rollers, freely pivoted about their axis which are conveniently tilted so as to confine the circumferential outside envelope of the seat of the tip to be shaped again.

In the accompanying drawing:

Fig. 1 is a sectional view of the tip of a ball point pen;

Fig. 2 is a top view of the roller arrangement;

Fig. 3 is a lateral view of the device shown in Fig. 2 in which two of the three rollers shown in Fig. 2 have been omitted for clarity;

Fig. 4 is a sectional view through the axis of a second embodiment of the same device.

According to Fig. 1 the edge 1 of the recess receiving the ball 3 upon long use widens as it is shown in the left half of the figure, and therefore the seat containing the ball does not hold the ink perfectly any longer and while writing inkspots are produced.

By applying the above mentioned tip to the device according to the invention as for instance to the one illustrated in Figs. 2, 3 and 4, the edge 1 is pressed against the ball so that the seat resumes its original shape as it is designated by 1a in the right half of Fig. 1.

The device illustrated in Figs. 2 and 3 comprises a rod 11 terminating with a head 10 on which are threaded three screws 12—13 and 14 so placed that their axes conveniently tilted meet in a point Z situated on the tip's axis passing through the ball. Three rollers 15, 16 and 17 disposed 120° apart are respectively and correspondingly provided for the three screws 12, 13 and 14, said rollers being free to rotate about their axes.

Each roller is permitted to rotate either on a ball bearing or on a roller bearing or about a normal pin. Besides being of cylindrical form, the roller may also be conveniently shaped so as to reproduce, as accurately as possible, the external profile of the edge of the tip to be reflanged.

Hence the surfaces of the three rollers confine the circumferential envelope of the tip's edge 1, so that pressing said tip against the device and at the same time forcing it to rotate, or rotating the device about the fixed tip, it is possible to obtain the perfect reprofiling or shaping again of the tip of a used ball point pen or the shaping of the tip of a new ball-point pen.

In the example illustrated in Fig. 4 the device presents the rollers conveniently placed in a hollow seat confined by projections 21 each of which is utilised for supporting a screw 24 on which the roller 27 rotates. Also in this case the axes of the three rollers are so tilted that their extensions would meet in the point Z, situated on the axis of the ball point pen.

The diameter of the flanging rollers are preferably designed so as to be three or five times larger than the diameter of the sphere, whose seat is to be reshaped.

What I claim is:

1. A device for reshaping the tip of a ball point pen comprising a cylindrcal support having a substantial cavity in one end thereof and inwardly converging projections about said cavity, the inner faces of said projections defining an interrupted frustro-conical surface, a plurality of cantilever bolts mounted on said projections and extending inwardly into said cavity, said bolts being normal to said frustro-conical surface, spaced equally circumferentially thereabout and spaced an equal distance from the tip of said surface, the inward extensions of said bolts intersecting in a common point on the axis of said support, a plurality of cylindrical rollers rotatably mounted on the free ends of said bolts, said device being adapted to be brought adjacent the tip of said ball point pen with the support in axial alignment with the pen and the cylindrical rollers bearing against the frustro-conical surface of the pen tip whereby the heat generated by the friction due to the slippage of said rotating cylindrical rollers on said frustro-conical surface of said pen will be retained by said cavity and facilitate deformation of the material of the tip of said pen about the ball therein.

2. A device for reshaping the tip of a ball point pen according to claim 1, wherein said cylindrical rollers are three in number and disposed 120° apart.

References Cited in the file of this patent

UNITED STATES PATENTS

| | | |
|---|---|---|
| 359,755 | Wicks | Mar. 22, 1887 |
| 1,297,819 | Ferrier | Mar. 18, 1919 |
| 1,922,087 | Hiester | Aug. 15, 1933 |
| 2,234,182 | Lauer | Mar. 11, 1941 |
| 2,286,511 | Schulenberg | June 16, 1942 |
| 2,498,009 | Schrader et al. | Feb. 21, 1950 |

FOREIGN PATENTS

| | | |
|---|---|---|
| 442,124 | Great Britain | Oct. 29, 1934 |